(12) United States Patent
Rüber et al.

(10) Patent No.: US 6,513,037 B1
(45) Date of Patent: Jan. 28, 2003

(54) METHOD OF AND ARRANGEMENT FOR EXECUTING A DATA BASE QUERY

(75) Inventors: Bernhard J. Rüber, Roetgen (DE); Andreas Kellner, Aachen (DE); Frank Seide, Taipei (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/375,947

(22) Filed: Aug. 17, 1999

(30) Foreign Application Priority Data

Aug. 17, 1998 (DE) .......................................... 198 37 102

(51) Int. Cl.⁷ .............................................. G06F 17/30
(52) U.S. Cl. ........................... 707/5; 704/251; 704/257; 704/275
(58) Field of Search ....................... 707/1–5, 101–104.1; 704/233, 236, 251, 270, 257, 9–10

(56) References Cited

U.S. PATENT DOCUMENTS

5,625,814 A * 4/1997 Lucin .............................. 707/5
5,832,181 A * 11/1998 Wang ........................... 704/232
6,173,279 B1 * 1/2001 Levin et al. .................... 707/5

FOREIGN PATENT DOCUMENTS

DE 19639843 4/1998 ............ G10L/5/02

OTHER PUBLICATIONS

Issar et al. "Unanswerable queries in a spotaneous speech task" Apr. 19–22, 1994, ICASSp–94., 1994 IEEE International conference, vol.: i, pp. I/341–I/344.*

Goddeau et al., "A form–based dialogue manager for spoken language applications", Oct. 3–6, 1996, Spoken language systems group, vol.: 2, pp. 701–704.*

Feldes et al.; A Design Environment for Acoustic Interfaces to Databases; Sep. 29–30, 1998; pp. 103–106.*

Victor W. Zue; Toward Systems that Understand Spoken Language; Feb. 1994; pp. 51–59; vol.: 9.*

Aust et al.; Database Query Generation From Spoken Sentences; Sep. 26–27, 1994; pp. 141–144.*

* cited by examiner

*Primary Examiner*—Jack Choules
*Assistant Examiner*—Mohammad Ali
(74) *Attorney, Agent, or Firm*—Daniel J. Piotrowski

(57) ABSTRACT

A data base query submitted in natural speech normally requires a dialog with the data base system, which repeatedly prompts the user to submit further statements. From each speech utterance submitted by the user a plurality of sets of statements are derived. The statements in these sets are tested for consistency with stored statements determined previously and consistent new statements are stored and stored statements are corrected or verified. Moreover, the stored statements are basically used in each dialogue step in order to derive from these statements an optimum request for the user by the system. Preferably, the statements are also stored with probability values or reliability values, the corresponding values of new statements to be stored being derived from the reliabilities of the statements of the respective speech utterance and the corresponding consistent statements stored.

5 Claims, 1 Drawing Sheet

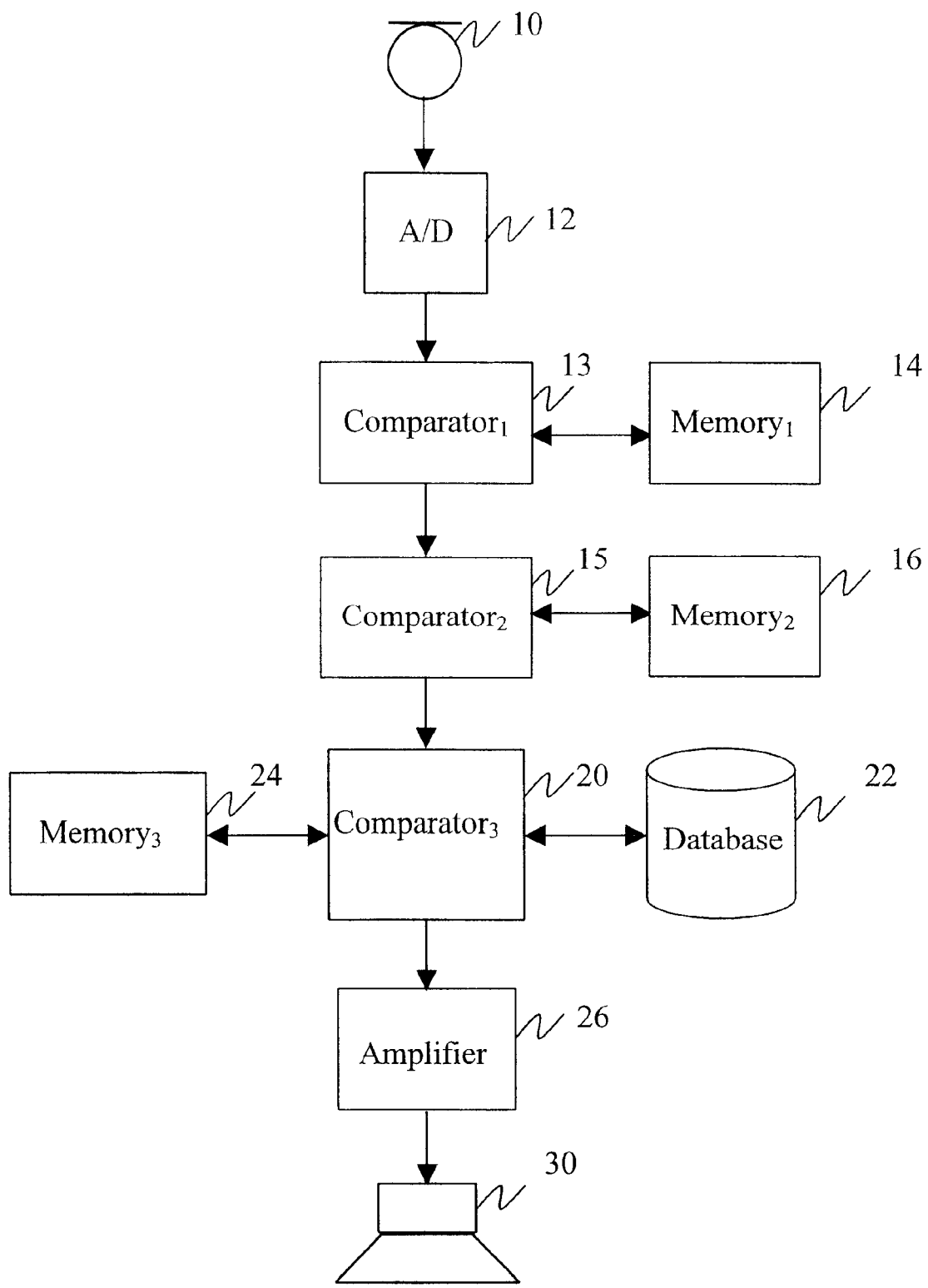

METHOD OF AND ARRANGEMENT FOR EXECUTING A DATA BASE QUERY

The invention relates to a method of executing a data base query by means of a data processing arrangement, the query being input by a user in the form of a plurality of speech utterances in natural speech and the data processing arrangement producing a speech output in response to each speech utterance and a recognition arrangement converting each speech utterance into at least one set of statements of the highest acoustic probability using a language model, which statements are tested for consistency, consistent statements being stored, and to an arrangement suitable for this purpose.

Such a method and a corresponding arrangement are known from DE 196 39 843.6 A1 (PHD 96.167). The statements of the highest probability, which have been derived from each speech utterance and which have been tested successfully for consistency, are stored therein. These statements are used for testing the statements derived from the next speech utterance for consistency and may eventually be used for the data base query. By means of a speech output issued by the system the user is prompted so many times to give a speech response until all the statements necessary for a data base query have been acquired. Thus, each speech output issued by the system depends to a limited extent on the preceding speech utterances and the statements derived therefrom.

However, with this method it is possible that the correct statement intended by the user through the speech utterance is not recognized with the highest probability but with a lower probability, for example due to an unsatisfactory pronunciation by the user. Since these statements of lower probability are not pursued any further, it is eventually possible, in the case that the dialogue with the user is continued with an incorrect statement recognized with the highest probability and this statement is not corrected, that the final data base query is derived from incorrect statements.

From WO 96/13030 a method of and an arrangement for a telephone inquiry service is known in which a plurality of statements are derived from each speech utterance of the user and are stored. However, the speech outputs presented to the user by the system proceed in accordance with a fixed scheme and the statements derived hitherto are used in order to reduce the amount of data from the data base with which the statements derived from the next speech utterance are compared.

It is an object of the invention to provide a method of the type defined in the opening paragraph, by means of which it is possible, in a wide variety of applications, to derive all the statements necessary for a data base query in a manner which is as reliable as possible and as convenient as possible for the user.

According to the invention this object is achieved in that after each speech utterance all the sets of statements derived therefrom are tested for consistency with all the stored sets of statements and the derived statements which have been tested successfully for consistency are stored, and at least one speech output is derived from stored statements.

Thus, not all the statements which are consistent and, consequently, useful are stored but these statements as well as previously determined statements are preferably used in each dialogue step in order to derive the next speech output to be issued by the system from these statements. As a result of this, it is then possible, for example, not only to generate general speech outputs, for example relating to the city and street of the desired subscriber in the case of a telephone inquiry service or a station or time of departure or destination in the case of a train schedule inquiry service but it is likewise possible to ask the user specific questions, for example in order to verify given statements, i.e. to prompt the user to repeat such statements, if desired in an alternative form.

The individual statements can be derived from a speech utterance by determining all the words of adequate individual probability in the speech signal or also in a manner as described in EP 702 353 A2 (PHD 94.120). In said method a word graph is derived from the speech utterance, from whose edges only those statements or that information is extracted which is relevant to the data base query. Moreover, general language models and dedicated rules may be adopted. For example, the statements "p.m."and "3 o'clock"are equivalent to the statement "15.00 hours".

Particularly with this known method of deriving statements from a speech utterance different statements are obtained for the same category of statements such as for example names, time indications etc., but these have different probabilities as a result of different similarity to the speech utterance and by virtue of further rules such as language models. Thus, an embodiment of the invention is characterized in that each statement is stored with a probability derived from the probability assigned to this statement and the highest probability of the stored statement which has been tested successfully for consistency. When during recognition, for example, several names are derived with different probabilities and at least some names have already been stored, those names are stored with a combined probability determined by the probability of the statement derived from the last speech utterance and of the previously stored statement.

When statements are derived from a speech signal the recognition arrangement supply a limited number of statements, for example a given number of statements or statements having probabilities above a given threshold. In general, this results in the total number of all statements being increased upon each dialogue step, i.e. upon each new speech utterance. In order to limit this effect, in accordance with a further embodiment of the invention, it is effective that only those statements are stored whose probabilities exceed a threshold value. This relates both to the combined probability which results from the probability of the statement itself and the most probable consistent statement stored.

When several sequences of statements are derived from a speech utterance it is also possible to form reliability values for these statements from the individual probabilities of the sets of statements including this statement. In this case, it is effective in a further embodiment of the invention that only those statements are stored whose reliability values exceed a threshold value. As a result of this, the number of statements to be stored and processed until the final generation of the data base query can be limited.

It is another object of the invention to provide an arrangement which enables the statements for a data base query to be determined in a most reliable manner which is convenient for the user. This object is achieved by means of the characteristic features defined in the further independent Claim.

The FIGURE shows an example of such an arrangement. The FIGURE shows a microphone 10 which picks up a speech utterance by a user and applies it to an arrangement 12 in which this speech utterance is sampled recurrently and the sampled speech signals are converted into digital values, from which characteristic values which characterize the speech signal are derived, for example the amplitudes in different frequency bands. These characteristic values are applied to an arrangement 13, which compares these values with reference values from a memory 14 and which derives word hypotheses from the comparison results.

The arrangement 13 outputs the terminated word hypotheses as a word graph which is applied to a further arrangement 15 in which a so-called concept graph is derived from the word graph by means of rules, stored in a memory 16, as described in the afore-mentioned EP 0 701 353 A2 (PHD 94.120). In the concept graph a number of different paths with different scores are possible from the beginning to the end of the concept graph. These scores are formed from the scores of the word graph and the rules and represent a measure of the acoustic probability that the series of concepts in the relevant path through the concept graph corresponds to the speech utterance actually spoken by the user.

These sets of statements are now applied to a further arrangement 20 in which the statements are tested for consistency. To this end, the statements are first tested for mutual consistency, i.e. for freedom of contradictions. Furthermore, the statements are compared with corresponding statements which have been determined during previous steps of the dialogue between the user and the system and have been temporarily stored in a memory 24. Finally, the statements in the sets supplied by the arrangement 1 are compared with at least some information items of the data base stored in a memory 22. This memory 22 is conventionally implemented as a disc memory having a high storage capacity. For example, it is checked whether a given statement, for example a given railway station name in the case of a train schedule information system or a given subscriber name in the case of a telephone directory system, is indeed present in the data base in the memory 22.

The scores corresponding to the probabilities supplied for the individual sets of statements by the arrangement 15 are used in the arrangement 20 as new scores for statements which have tested successfully for consistency, in that a new probability is determined from these probabilities and the best probabilities of the statements with which consistency has been detected, which new probability is stored with the statements in the memory 24. Before the storage the new probabilities are compared with a threshold value, which may be constant or which is adapted in the course of the dialogue. It is alternatively possible to generate reliability values from the probabilities of all the sets of statements derived from a speech utterance and to compare these in a similar manner with a threshold value and store them together with the statements. The stored statements with the probability values or reliability values are used again during the next speech utterance for testing the statements derived from this speech utterance.

After then processing of each speech utterance the arrangement 20 verifies whether all the statements for a complete data base query are available. If this is not the case, a the arrangement 20 generates a speech output in response to the statements and probabilities stored in the memory 24, which via an amplifier 26 and a loudspeaker 30 prompts the user acoustically to provide a speech utterance with certain further statements. For this, use is made each time of the statements having the highest probabilities from the memory 24. When individual statements are corrected, for example ignored, as a result of the next speech utterance from the user, the respective statement is for example erased during the subsequent processing of this speech utterance and the statement of the same category, for example names, is used with the next lower probability or reliability as the dialogue proceeds. This process is repeated until finally all the statements for a complete data base query are available with satisfactory probability or reliability.

What is claimed is:

1. A method of executing a data base query by means of a data processing arrangement, the query being input by a user in the form of a plurality of speech utterances in natural speech and the data processing arrangement producing a speech output in response to each speech utterance and a recognition arrangement converting each speech utterance into at least one set of statements of the highest acoustic probability using a language model, which statements are tested for consistency, consistent statements being stored, characterized in that after each speech utterance all the sets of statements derived therefrom are tested for consistency with all the stored sets of statements and the derived statements which have been tested successfully for consistency are stored, and at least one speech output is derived from stored statements.

2. A method as claimed in claim 1, in which the recognition arrangement assigns a probability to each statement, characterized in that each statement is stored with a probability derived from the probability assigned to this statement and the highest probability of the stored statement which has been tested successfully for consistency.

3. A method as claimed in claim 2, characterized in that only those statements are stored whose probabilities exceed a threshold value.

4. A method as claimed in claim 2, in which for each statement a reliability is derived from the probabilities of the sets of statements including the respective statement, characterized in that only those statements are stored whose reliability exceeds a threshold value.

5. An arrangement for executing data base queries from a user in the form of speech utterances in natural speech, comprising;

a recognition arrangement for deriving from each speech utterance at least one set of statements of maximal acoustic probability using a language model and for at least one supplied said set of statements, and a control arrangement for testing each set of statements supplied by the recognition arrangement for consistency and for generating speech outputs, wherein the recognition arrangement is adapted to derive from each speech utterance a plurality of sets of statements of decreasing probabilities, and includes a memory arrangement for storing a plurality of different sets of statements, and wherein the control arrangement is adapted to test each set of statements derived from a speech utterance for consistency with the corresponding statements of all the stored sets of statements, store sets of consistent statements in the memory arrangement, and generate at least one speech output from the stored statements.

* * * * *